United States Patent

[11] 3,601,365

| [72] | Inventor | Henry M. Hall<br>P.O. Box 9603, Atlanta, Ga. 30319 |
|---|---|---|
| [21] | Appl. No. | 816,296 |
| [22] | Filed | Apr. 5, 1969 |
| [45] | Patented | Aug. 24, 1971 |

[54] DUCT RODDER
7 Claims, 8 Drawing Figs.

[52] U.S. Cl. ............................................. 254/134.3FT
[51] Int. Cl. ............................................. E21c 29/16
[50] Field of Search ...................................... 254/134.3
FT, 133.1, 29, 30, 31; 248/2, 13, 16; 15/104.3;
226/162, 166, 173

[56] References Cited
UNITED STATES PATENTS
2,192,909  3/1940  Hoffar .......................... 254/29 X
2,652,877  9/1953  Travis .......................... 226/162 X Primary Examiner—Robert C. Riordon
Assistant Examiner—David R. Melton
Attorney—Jones and Thomas ABSTRACT: A duct rodder of the type utilized to urge rods through the ducts of an underground telephone conduit, comprising an elongated housing, a rod gripping member movable back and forth along the length of the housing, and drive means for positively driving said rod gripping member. The rod gripping member comprises a U-shaped bracket for receiving a rod, and a pivotal wedge member is supported by the legs of the bracket above the position normally occupied by the rod, and is movable into frictional engagement with the rod in such a manner that when the rod gripping member is moved in one direction the rod gripping member carries the rod with it, and when the rod gripping member is moved in the opposite direction, it moves over the surface of the rod.

PATENTED AUG 24 1971
3,601,365
SHEET 1 OF 2
FIG.1
FIG.3
FIG.4
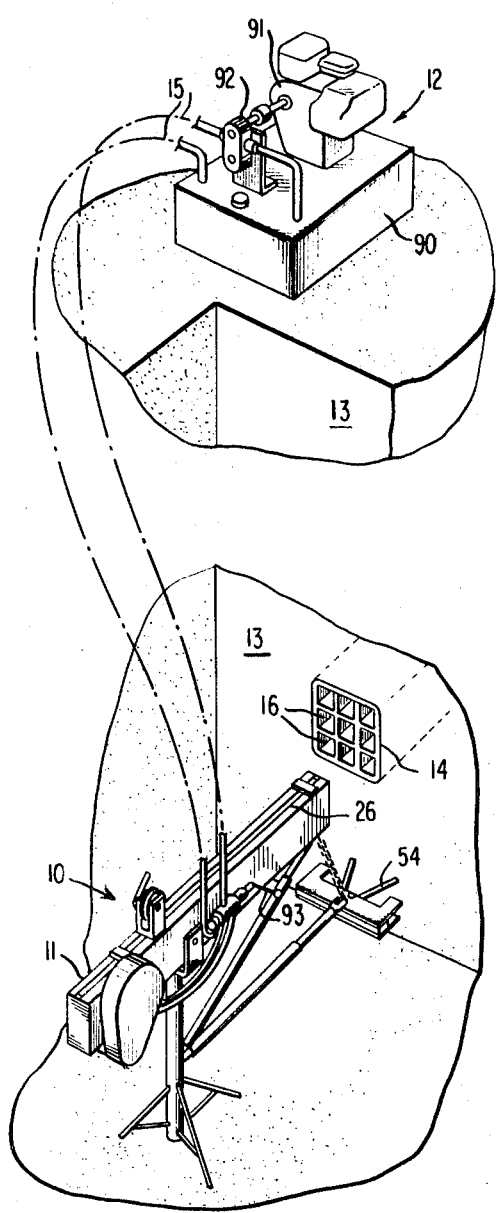
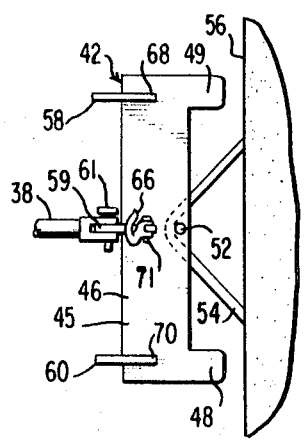
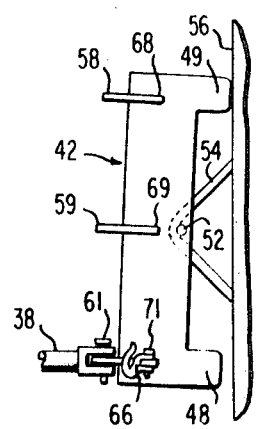
FIG.5
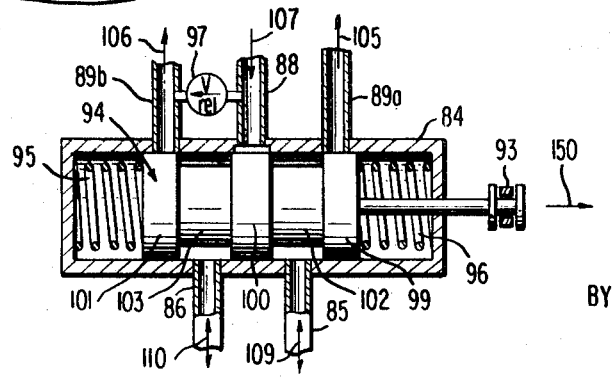
FIG.8
INVENTOR
HENRY M. HALL
BY *Jones & Thomas*
ATTORNEYS

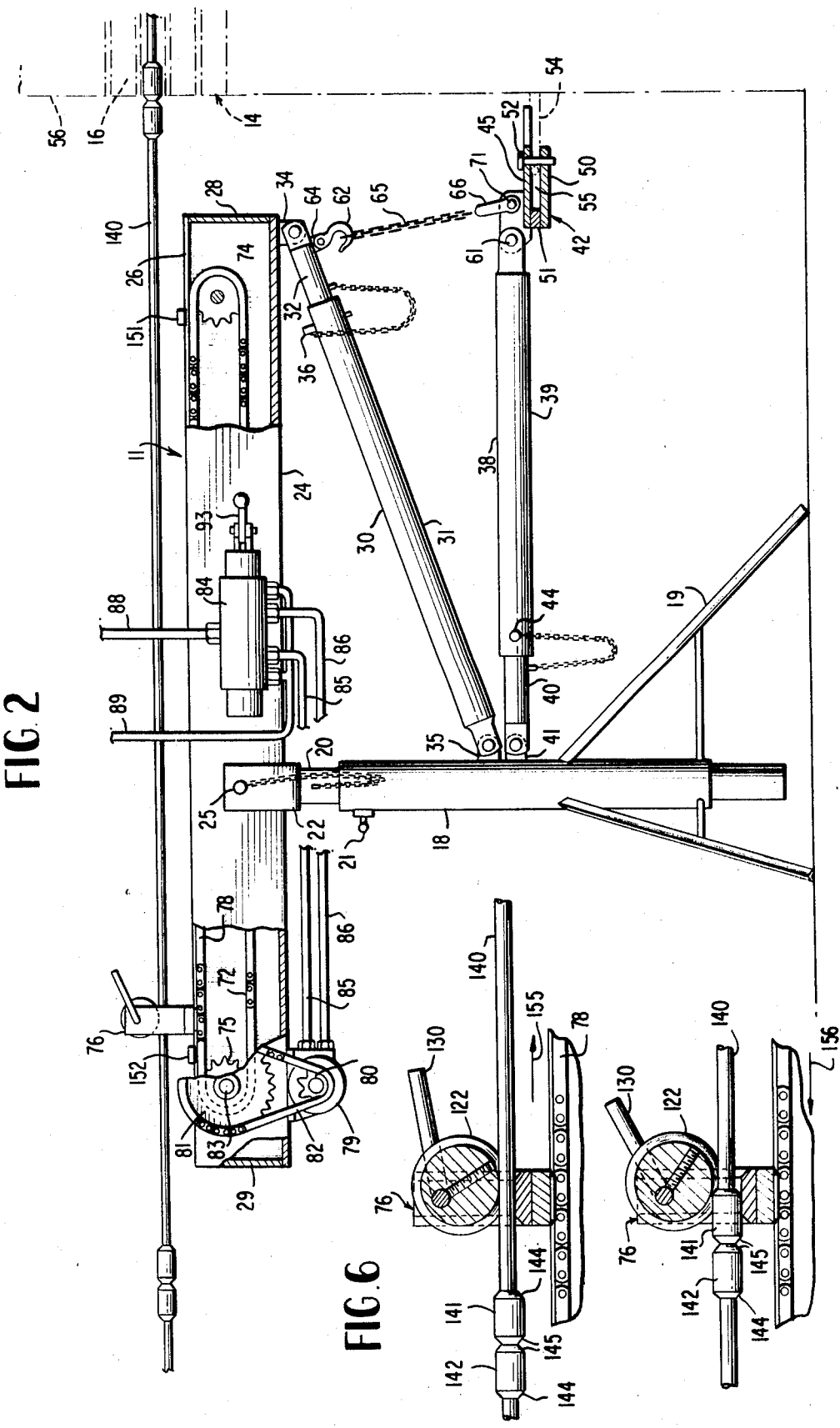

3,601,365

DUCT RODDER

BACKGROUND OF THE INVENTION

When telephone cables or similar electric conductors are placed underground, the usual arrangement is to extend the wires or cables through conduits specifically constructed for this purpose. These conduits are usually divided into smaller conduits or ducts, and each duct is usually used for a single wire or cable. This maintains the cables separated from one another and orients the cables so that the lineman will not confuse the cables.

The ducts of an underground telephone conduit are small since only a small space is required to accommodate a single cable or wire. The small sizes of the ducts and cables make it difficult to extend the cables through the conduit, and the usual procedure for passing the cables through a duct is to first pass a stiff rod through the aligned ducts of a series of conduits from one manhole space to another manhole space, and then connect a wire or cable to one end of the stiff rod and pull the wire or cable through the duct. Since the space in a typical manhole is usually small and a conduit usually extends a substantial distance between manholes, the rods have been made in sections that are connectable together and the lineman extends the rod partially into a duct and connects another rod to the projecting end of the first rod, and then thrusts the second rod into the duct. This procedure is repeated until the connected rod sections extend from one manhole space to another manhole space through a duct of the telephone conduit. Of course, after several rod sections have been extended through the duct of the conduit, it becomes more difficult to continue to move the rods, and power equipment is frequently used to assist in this operation. The power equipment developed in the past has been cumbersome to erect and operate.

SUMMARY OF THE INVENTION

Briefly described, the present invention comprises a duct rodder for urging rods through the ducts of underground telephone conduits or the like, which is convenient to erect and operate, requires a minimum of space in the manhole opening, and which can be accurately controlled by the operator with a minimum of attention and effort. A gripping mechanism is moved by a power drive system in a horizontal direction back and forth toward and way from the duct through which the rod sections are to be urged, and comprises a wedging member which grips the rod sections when moving toward the ducts and releases the rod sections when moving away from the ducts. To reverse the force urged on the rod sections, the position of the wedging member can be reversed, and the rod sections will be pulled from the duct.

Thus, it is an object of this invention to provide a reversible duct rodder which is convenient and expedient to use, which is inexpensive to manufacture and operate, and which occupies a small space in a manhole opening.

Another object of this invention is to provide a duct rodder for extending rods through the ducts of an underground telephone conduit which includes a gripping mechanism adaptable to various different rod sizes and which accommodates the joints and other protrusions present on a typical sectional rod system without binding or damaging the rod system.

Other objects, features and advantages of the present invention will become apparent upon reading the following specification, when taken in conjunction with the accompanying drawing.

BRIEF DESCRIPTION OF THE DRAWING

FIG. 1 is a schematic perspective view of the duct rodder as it is used in a typical manhole space.

FIG. 2 is a side elevational view, partially in cross section, of the rod feeder portion of the duct rodder.

FIG. 3 is a top view of the connecting yoke of the duct rodder.

FIG. 4 is a top view of the connecting yoke, similar to FIG. 3, but showing an alternate connecting arrangement.

FIG. 5 is an exploded perspective view of the rod gripper.

FIGS. 6 and 7 are schematic side elevation views of the rod gripper, showing the manner in which the rod gripper grips and urges a rod through a duct.

FIG. 8 is a schematic illustration of the control valve of the duct rodder.

DESCRIPTION OF THE PREFERRED EMBODIMENTS

Referring now in more detail to the drawings, in which like numerals indicate like parts throughout the several views, FIG. 1 shows a duct rodder 10 which includes a rod feeder mechanism 11 and a power drive 12. Rod feeder mechanism 11 is normally located in a manhole space 13 and placed in alignment with a telephone conduit 14. Power drive 12 is normally located at the ground level above the manhole space 13 and is connected to rod feeder 11 by means of flexible hoses 15. Telephone conduit 14 is divided into a plurality of ducts 16, and rod feeder 11 is aligned with one of the ducts 16 when in operation.

As is best shown in FIG. 2, rod feeder 11 comprises an upright tubular support member 18 which is maintained in an upright attitude by tripod 19. Extendable support bar 20 is telescopically received in tubular support member 18, and is rigidly connected thereto by means of setscrew 21. Support yoke 22 is connected to the upper end of extendable support bar 20 and is connected to rod feeder housing 24 by connecting pin 25. Housing 24 is of elongated rectilinear configuration and normally oriented with its long axis extending in a horizontal direction. Housing 24 is generally of C-shaped or channel configuration in cross section with its opening 26 comprising a slot which extends along its upper wall portion. The forward and rear ends of housing 24 are closed by end walls 28 and 29. Thus, housing 24 is closed except for its slot 26.

Housing support brace 30 comprises a tubular section 31 and rod section 32. Rod section 32 is connected at its upper end to one end of rod feeder housing 24 by means of tab 34, and is telescopically received in tubular section 31. Tubular section 31 is connected to upright tubular support member 18 by means of tab 35. Connecting pin 36 projects through aligned apertures (not shown) defined in tubular section 31 and rod section 32 to rigidly connect these elements to each other.

Connecting brace 38 also comprises a tubular section 39 and a rod section 40. Rod section 40 is connected to upright tubular support member 18 by means of tab 41 and is telescopically received within tubular section 39. Connecting yoke 42 is connected to tubular section 39. Connecting pin 44 rigidly connects tubular section 39 to rod section 40.

Connecting yoke 42 comprises U-shaped yoke member 45 which includes body portion 46 and leg projections 48 and 49 (FIG. 3). Locking plate 50 is positioned below yoke member 45 and maintained in spaced relationship therefrom by spacer 51. Yoke member 45 and locking plate 50 define aligned openings, and connecting pin 52 extends through the openings. The typical manhole space has a bent bar 54 imbedded in its wall and which projects out into the space beneath the telephone conduit 14. Connecting yoke 42 is positioned so that bar 54 of the manhole space projects into the slot 55 between yoke member 45 and locking plate 50, and connecting pin 52 is inserted into the bite of bent bar 54, to connect connecting yoke 42 to the wall 56 of the manhole space.

Three projections 58, 59, and 60 are connected to the rear edge of yoke member 45, and each projection defines an opening therethrough. Connecting brace 38 is connected to one of the projections 58–60 by extending connecting pin 61 through the aligned apertures of connecting brace 38 and the aperture of one of the projections 58, 59, or 60. As is shown in FIG. 3, when connecting brace 38 is connected to projection 59 which is in the center of the connecting yoke 42, the leg projections 48 and 49 will normally be maintained in spaced relationship from wall 56. When connecting yoke 38 is connected to one of the end projections 58 or 60 as shown in FIG. 4, connecting yoke 42 will pivot so that its leg opposite from the projection to which connecting brace 38 is connected will be urged into wall 56 when a pull is felt through connecting brace 38.

To further stabilize rod feeder housing 24, a hook 62 is connected to rod section 32 of housing support brace 30 by means of tab 64, and link chain 65 is connected to hook 62 and extended down toward connecting yoke 42. A hook 66 is connected to yoke member 45 and extends in an upward direction for connection to chain 65. Hook 66 is connected to yoke member 45 by means of apertured projections 68, 69, and 70 which may be part of or separate from projections 58, 59, and 60. Hook 66 also defines an aperture in its base portion, and connecting pin 71 is projected through the aperture of hook 66 and the aperture of one of the projections 68, 69 or 70. Hook 66 is normally connected to a hook projection 68, 69, or 70 which is adjacent the brace connection 58, 59, or 60 to which brace 38 is connected. With this arrangement, chain 65 will always extend substantially in a vertical direction so that rod feeder housing 24 is oriented in the same direction as connected brace 38.

A continuous roller chain 72 is supported within rod feeder housing 24 by means of sprockets 74 and 75, with sprocket 74 being an idler sprocket and sprocket 75 being a drive sprocket. Rod gripper 76 is connected to the upper flight 78 of chain 72. Hydraulic motor 79 is connected to the lower portion of rod feeder housing 24 at end wall 29, and its drive sprocket 80 is connected to driven sprocket 81 by means of driving chain 82. Sprockets 81 and 75 are rigidly connected to a common axle 83, so that hydraulic motor 79 functions to drive sprocket 75 and continuous chain 72. Hydraulic motor 79 is connected to valve housing 84 by means of conduits 85 and 86. Valve housing 84 is mounted on the side of rod feeder housing 24, and flexible hoses 15 from power drive 12 are connected to conduits 88 and 89 of the valve housing.

Power drive 12 includes a tank 90 for accommodating a supply of hydraulic fluid, internal combustion engine 91, and pump 92. Pump 92 is a positive displacement pump and is driven by engine 91. Pump 92 functions to urge the hydraulic fluid from tank 90 through one of the flexible hoses 15 toward valve housing 84, while the other flexible hose 15 functions to route the low-pressure fluid from valve housing 84 back to tank 90.

As is shown in FIG. 8, valve spool 94 is reciprocally received in valve housing 84 and normally maintained in the central position as shown in FIG. 8 by means of centering springs 95 and 96 at opposite ends of spool 94. Spool 94 includes lands 99, 100, and 101, and intermediate grooves 102 and 103. Conduit 88, which is connected to pump 92 of power drive 12 extends through valve housing 84 and is normally located adjacent center land 100 of valve spool 94. Conduits 85 and 86 are normally located adjacent grooves 102 and 103, respectively, while branches 89a and 89b of conduit 89 extend through housing 84 in the vicinity of lands 99 and 101, respectively. As indicated by arrows 105, 106, and 107, the flow of fluid is toward valve housing 84 through conduit 88, and away from valve housing 84 through branch conduits 89a and 89b. As indicated by arrows 109 and 110, the flow of fluid through ducts 85 and 86 is reversible. Adjustable pressure relief valve 97 is connected between conduit 88 and branch 89b and arranged to pass hydraulic fluid from conduit 88 when a predetermined pressure is reached therein.

Rod gripper 76 comprises support platform 114 connected to the upper flight 78 of chain 72 and U-shaped bracket 115 connected to support platform 114. U-shaped bracket 115 includes upright leg portions 116 and 118 and base portion 119. Aligned apertures 120 and 121 are defined at the upper ends of leg portions 116 and 118, respectively. Wedging disc 122 is mounted in the opening 124 of bracket 115. Wedging disc 122 defines an offcenter opening 125, and a peripheral groove 126. Setscrew opening 128 extends from peripheral groove 126 to offcenter opening 125. Handle 130 includes an axle portion 131 and a lever portion 132. Axle portion 131 is extendable through the aligned openings 120 and 121 of the upright legs 116 and 118 of bracket 115, and through the offcenter opening 125 of wedging disc 122. Once positioned in this manner, setscrew 129 is urged through its opening 128 to frictionally engage axle portion 131 and rigidly connect wedging disc 122 with handle 130, and to rotatably connect wedging disc 122 and handle 130 to U-shaped bracket 115.

The edges 134 and 135 of U-shaped bracket 114 adjacent opening 124 of the bracket are beveled at an angle of approximately 45° with respect to the inside surface of U-shaped opening 124 of bracket 115. The bottom surface 136 of opening 124 of bracket 115 is curved. Peripheral groove 126 of wedging disc 122 is also curved. The curvature of groove 126 is chosen to substantially match the curvature of the rod which is to be gripped by rod feeder mechanism 11, and the curvature of bottom portion 136 of U-shaped bracket 115 is also ideally chosen to match the curvature of the rod; however, these curvatures do not have to be identical to the curvature of the outside surface of the rod in order to effectively grip the rod.

The rods normally utilized in the process of extending wire or cable through ducts of a telephone conduit comprise sections 140 with a male connector 141 at one end and a female connector 142 at the other end. When one section 140 is urged part way into a duct 16, another section is connected thereto, by matching its connector with the connector of the first section, and then both sections are urged into the duct. Connectors 141 and 142 are larger in diameter than the rod section 140. The leading and trailing edges 144 and 145 of each connector are beveled so that a streamlined surface is presented to the duct surfaces as the rod sections are urged through the duct, and the connectors will not tend to bind in the duct.

OPERATION

When the workman sets up duct rodder 10, he positions power drive 12 above ground and extends flexible hoses 15 down into the manhole space 13. Rod feeder mechanism 11 is positioned down in the manhole space. Rod feeder housing 24 is positioned in alignment with the particular duct 16 of conduit 14 that is to have a rod extended therethrough. The height of rod feeder housing 24 is adjusted by loosening setscrew 21 and moving extendable support bar 20 through upright tubular support member 18 until the proper elevation is attained, and by tightening setscrew 21. Connecting yoke 42 is attached to the bar 54 extending from the wall 56 of the manhole space by inserting connecting pin 52 through the aligned apertures of U-shaped yoke member 45 and locking plate 50 inside bar 54. Connecting brace 38 is then attached to the projection 58, 59, or 60 which is located below the duct 16 through which the rod is to be extended. Rod feeder housing 24 is then tilted about its support yoke 22 usually to a horizontal attitude, until it is in alignment with the duct. Connecting pin 36 is then inserted through the aligned apertures or tubular section 31 and rod section 32 of housing support brace 30, which locks housing 24 in this position. Housing 24 is further anchored in place by extending chain 65 between hook 62 of housing support brace 30 and hook 66 of connecting yoke 42. If the duct 16 that is to be threaded is located to one side of the conduit 14, connecting brace 38 will be connected to a projection on the corresponding side of connecting yoke 42, and hook 66 of connecting yoke 42 will be connected to the corresponding projection (FIG. 4).

Flexible hoses 15 are connected to valve housing 84 and power drive 12 is then energized by cranking its engine 91, which drives pump 92 and charges one of the flexible hoses 15 with hydraulic pressure. The operator then extends a section of rod 140 through the opening 124 of U-shaped bracket 115 below wedging disc 122 and into a duct 16 of conduit 14. Wedging disc 122 will fall into frictional contact with the rod section by gravity since its opening 125 is off center. The operator then manipulates valve lever 93 to cause the pressurized fluid to flow to and from hydraulic motor 79, which drives roller chain 72. The movement of chain 72 causes rod gripper 76 to move over the upper surface of rod feeder housing 24.

As is shown in FIG. 8, the flexible hose 15 which carries the flow of hydraulic fluid from pump 92 toward manhole space 13 is connected to inlet conduit 88 of valve housing 84. When valve lever 93 is moved toward the front or end wall 28 of housing 24, center land 100 of valve spool 94 will be moved in the direction as indicated by arrow 150, which allows the fluid to pass around groove 103 of valve spool 94 toward conduit 86. The fluid flowing through conduit 86 causes hydraulic motor 79 to rotate, and drive chain 82 is driven in a direction so that sprocket 75 functions to move drive chain 72 and move its upper flight 78 toward the front of rod feeder housing 24. This functions to carry rod gripper 76 toward the front of housing 24 until support platform 114 of rod gripper 76 engages the stop projections 151 on the upper surface of rod feeder housing 124. The hydraulic fluid displaced from hydraulic motor 79 passes back through conduit 85 and enters valve housing 84. The fluid passes around valve spool groove 102 and enters conduit 89a, where it travels back through conduit 89 and a flexible hose 15 toward tank 90.

In order to reverse the movement of rod gripper 76, valve lever 93 is moved in the opposite direction, to move valve spool 94 in the direction opposite from arrow 150, whereupon land 100 of valve spool 94 allows the fluid flowing through duct 88 to communicate with duct 85. This functions to drive hydraulic motor 79 in the opposite direction. The fluid displaced from hydraulic motor 79 flows back through conduit 86, around groove 103 of valve spool 94, and exits through conduit 89b, and travels back through conduit 89 and a flexible hose 15 toward tank 90. Rod gripper 76 moves back toward the rear end of rod feeder housing 24 until it engages stop projections 152. In order to control the force with which rod gripper 76 is moved, adjustable pressure relief valve 97 is adjusted to require a greater or lesser pressure differential between conduits 88 and 89b. When the valve spool 94 is centered by centering springs 95 and 96, the entire flow of hydraulic fluid through conduit 88 will pass through pressure relief valve 97 to conduit 89b and bypass hydraulic motor 79. Furthermore, when valve spool 94 has been moved toward one of the ends of housing 84 so that hydraulic pressure communicates with hydraulic motor 79 and rod gripper 76 has been driven to the end of rod feeder housing 24 and abuts one of the stop projections 151 or 152, the buildup of pressure in the system will again open valve 97 to allow the high pressure fluid to bypass into the low-pressure conduit 89b.

As is shown in FIGS. 6 and 7, wedging disc 122 falls under the force of gravity into contact with rod section 140. When rod gripper 76 is moved in the direction as indicated by arrow 155, and wedging disc 122 has been pivoted in a clockwise direction so that its larger mass is on the right side of U-shaped bracket 115 (FIGS. 6 and 7), the frictional contact between rod section 140 and wedging disc 122 will tend to create a firm grip between rod gripper 76 and rod section 140, so that rod section 140 will be carried with rod gripper 76. When rod gripper 76 reaches the end of rod feeder housing 24, the operator reverses the position of valve lever 93 which causes rod gripper 76 to travel in the direction as indicated by arrow 156, back toward the rear end of housing 24. When moving in this direction, wedging disc 122 tends to move in a counterclockwise direction (FIGS. 6 and 7) to release frictional contact with the rod section. Thus, rod gripper 76 slides about the rod section. When the rod gripper passes over a joint or connection, the tapered ends 144 of the connectors 141 and 142 will slide up the tapered edge 134 of U-shaped bracket 115, so that the rod gripper 76 will not bind with a connection in the sections of rod. Also, wedging disc 122 merely pivots further in a counterclockwise direction to lift over the connection of the rod (FIG. 7). After having passed over such a joint, wedging disc 122 falls back into contact with the rod section.

After a series of rod sections have been inserted through a duct 16 of a conduit 14 so that the assembled sections extend from one manhole space to another manhole space, an electric cable or a wire can be connected to the remote end of the rod sections. Handle 130 is then moved over to the other side of U-shaped bracket 115, which reverses the position of wedging disc 122, so that the larger mass of the disc is located on the other side of bracket 115. The operator then continues to manipulate valve lever 93, to move rod gripper 76 back and forth along the upper surface of rod feeder housing 24, but rod gripper 76 commences to grip the rod as it moves toward the rear of the housing and releases the rod as it moves toward the front of the housing, thus pulling the rod sections back through duct 16, which functions to carry the electric cable or wire through the duct. Of course, as each rod section emerges from duct 16 and passes through rod gripper 76, it can be disconnected from the series of rod sections. When reversing the direction of force exerted on the rod sections, all that is necessary is to rotate handle 130, which moves wedging disc 122 to one side or the other side of U-shaped bracket 115. No realignment or movement or reconnection of rod feeder mechanism is required, and no adjustments need be made in power drive 12.

When the length of the assembled rod sections becomes great so that the frictional contact between the rod sections and the walls of the duct increases, a larger driving force may be required by rod feeder mechanism 11. This increased driving force can be attained by adjusting pressure relief valve 97 of valve housing 84, to require a larger pressure in the system to open valve 97. This effectively increases the pressure transmitted to hydraulic motor 79, which causes motor 79 to drive chain 72 with more force.

While wedging disc 122 has been disclosed as being disc shaped, it will be understood that various other shapes can be utilized to achieve the same function. Also, while valve 97 is shown as the pressure control valve of the system, it should be understood that various other pressure control valves can be utilized. For instance, hydraulic motor 79 can be equipped with a pressure control valve, or pump 92 of power drive 12 can be similarly equipped. These arrangements are conventional in the pump and motor art, and while this invention has been described in detail with particular reference to preferred embodiments thereof, it will be understood that variations and modifications can be effected within the spirit and scope of the invention as described hereinbefore and as defined in the appended claims.

I claim:

1. Apparatus for urging a rod through a conduit or the like comprising an upright tubular support member, a second support member telescopically received in said upright support member, means for locking together said upright support member and said second support member, a rectilinear housing connected to the upper end of said second support member, an expandable brace connected at one of its ends to said upright support member and at the other of its ends to said housing for normally supporting said housing with its longitudinal centerline extending horizontally, a connecting brace connected at one of its ends to said upright support member and connectable at its other end to a rigid support or the like, rod gripping means movable back and forth along the length of said housing, and drive means connected to said rod gripping means.

2. The invention of claim 1 wherein said drive means includes a continuous chain member having an upper flight extending along the length of said housing, an hydraulic motor in driving connection with said chain member, hydraulic pressure means, conduit means communicating said hydraulic pressure means with said hydraulic motor, and valve means connected to said conduit means for controlling the flow through said conduit means.

3. The invention of claim 1 wherein said gripping means comprises a support element for receiving a rod, a wedge member rotatably connected to said support element at a position above the position normally occupied by the rod and rotatable down into frictional engagement with the rod.

4. Apparatus for urging a rod from a manhole area through a conduit or the like comprising a housing, a rod gripping member movable along said housing, and drive means for moving said rod gripping member in a rectilinear path back and forth along said housing, said rod-gripping member comprising means for gripping a rod when moved in a first direction along said path and for releasing the rod when moved in a second direction along said path, or alternatively for gripping a rod when moved in the second direction along said path and for releasing the rod when moved in the first direction along said path, adjustable upright support means connected to said housing for supporting said housing at various elevations from the ground or the like, brace means connected to said upright support means and for connection at its other end to a bent bar or the like rigidly installed in the manhole area.

5. The invention of claim 4 wherein said rod gripping member comprises a U-shaped bracket, a disc member positioned in said bracket, and support means rotatably connecting said disc member in an offcenter relationship with said U-shaped bracket.

6. The invention of claim 5 wherein said disc member defines a peripheral groove, and said U-shaped bracket includes tapered edges adjacent said disc member.

7. The invention of claim 5 wherein said support means comprises an axle member extending through the leg portions of said U-shaped bracket and through said disc member, and connecting means rigidly connecting together said disc member and said axle member.